United States Patent
Herman et al.

(10) Patent No.: US 11,555,728 B2
(45) Date of Patent: Jan. 17, 2023

(54) FLUID LEVEL DETECTION

(71) Applicant: Ford Global Technologies, LLC, Dearborn, MI (US)

(72) Inventors: David Michael Herman, Oak Park, MI (US); Ashwin Arunmozhi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 16/679,966

(22) Filed: Nov. 11, 2019

(65) Prior Publication Data

US 2021/0140808 A1   May 13, 2021

(51) Int. Cl.
*B60S 1/56* (2006.01)
*G01F 22/00* (2006.01)
*H05B 1/02* (2006.01)
*G05D 1/00* (2006.01)
*B60S 1/50* (2006.01)
*B60S 1/52* (2006.01)

(52) U.S. Cl.
CPC ........... *G01F 22/00* (2013.01); *G05D 1/0088* (2013.01); *H05B 1/0236* (2013.01); *B60S 1/50* (2013.01); *B60S 1/52* (2013.01); *B60S 1/56* (2013.01)

(58) Field of Classification Search
CPC .... G01F 22/00; G05D 1/0088; H05B 1/0236; B60S 1/50; B60S 1/52; B60S 1/56
See application file for complete search history.

(56) References Cited

U.S. PATENT DOCUMENTS

| | | |
|---|---|---|
| 5,174,153 A | 12/1992 | Nakano |
| 2003/0035462 A1* | 2/2003 | Savoie ................. G01F 23/246 374/141 |
| 2015/0343999 A1 | 12/2015 | Lopez Galera et al. |
| 2021/0094489 A1* | 4/2021 | Damaraju .......... B60H 1/00885 |

FOREIGN PATENT DOCUMENTS

| | | |
|---|---|---|
| FR | 2733586 A1 | 10/1996 |
| JP | 3132127 B2 | 2/2001 |
| WO | 03059710 A1 | 7/2003 |

\* cited by examiner

*Primary Examiner* — Mathew Franklin Gordon
(74) *Attorney, Agent, or Firm* — Frank A. MacKenzie; Bejin Bieneman PLC (57) ABSTRACT

A system includes a computer having a processor and a memory storing instructions executable by the processor to determine a first temperature of a fluid stored by a fluid storage device and then actuate a fluid heating device to add heat energy to the fluid. The instructions include instructions to determine an amount of the heat energy added to the fluid. The instructions include instructions to determine a second temperature of the fluid stored by the fluid storage device after adding the heat energy to the fluid. The instructions include instructions to determine a quantity of the fluid stored by the fluid storage device based on the amount of the heat energy added to the fluid by the fluid heating device and a difference between the first temperature and the second temperature.

20 Claims, 4 Drawing Sheets

FLUID LEVEL DETECTION

BACKGROUND

A vehicle may include a fluid washer assembly for cleaning surfaces of the vehicle e.g., a surface of a windshield, a transparent sensor cover or lens, a facia covering a sensor, etc. The fluid washer assembly may include one or more nozzles, a fluid pump, and a fluid reservoir in fluid communication with each other. The nozzle(s) may be directed at the various surfaces of the vehicle. Actuation of the fluid pump moves fluid from the fluid reservoir to the nozzles. Sensors, such as float ball sensors, may indicate when the fluid in the fluid reservoir is at specified levels, e.g., when the fluid reservoir is full, almost empty, etc.

DETAILED DESCRIPTION

A system includes a computer having a processor and a memory storing instructions executable by the processor to determine a first temperature of a fluid stored by a fluid storage device and then actuate a fluid heating device to add heat energy to the fluid. The instructions include instructions to determine an amount of the heat energy added to the fluid. The instructions include instructions to determine a second temperature of the fluid stored by the fluid storage device after adding the heat energy to the fluid. The instructions include instructions to determine a quantity of the fluid stored by the fluid storage device based on the amount of the heat energy added to the fluid by the fluid heating device and a difference between the first temperature and the second temperature.

The instructions may include instructions to actuate the fluid heating device to add heat energy to the fluid until the second temperature is a predetermined amount greater than the first temperature.

The instructions may include instructions to determine the amount of the heat energy added to the fluid by the fluid heating device based on an amount of time that the fluid heating device was actuated to increase the temperature of the fluid from the first temperature to the second temperature.

The instructions may include instructions to determine the amount of the heat energy added to the fluid by the fluid heating device based on a current draw of the fluid heating device and an amount of time of actuation of the fluid heating device.

The instructions may include instructions to further determine the quantity of the fluid stored by the fluid storage device based on an ambient temperature.

The instructions may include instructions to further determine the quantity of the fluid stored by the fluid storage device based on a difference between the ambient temperature and the first temperature of the fluid.

The instructions may include instructions to operate a vehicle in an autonomous mode upon determining that the quantity of fluid is greater than a threshold amount, and to operate the vehicle in a non-autonomous mode upon determining that the quantity of fluid is not greater than the threshold amount.

The system may include the fluid storage device, a temperature sensor configured to measure a temperature of the fluid stored by the fluid storage device, and the fluid heating device configured to add heat energy to the fluid stored by the fluid storage device.

The fluid storage device may include a first reservoir and a second reservoir in fluid communication with the first reservoir such that a fluid level of the second reservoir is representative of a fluid level of the first reservoir.

The temperature sensor may be configured to measure a temperature of the fluid in the second reservoir.

The temperature sensor may be fixed to the second reservoir.

The fluid heating device may be configured to add heat energy to the fluid in the second reservoir.

The second reservoir may have a lower volume than the first reservoir.

The system may include a fluid washer assembly that includes the fluid storage device.

A method includes determining a first temperature of a fluid stored by a fluid storage device. The method includes actuating a fluid heating device to add heat energy to the fluid. The method includes determining an amount of the heat energy added to the fluid by the fluid heating device. The method includes determining a second temperature of the fluid stored by the fluid storage device after adding the heat energy to the fluid. The method includes determining a quantity of the fluid stored by the fluid storage device based on the amount of heat energy added to the fluid by the fluid heating device and a difference between the first temperature and the second temperature.

The method may include actuating the fluid heating device to add the heat energy to the fluid until the second temperature is a predetermined amount greater than the first temperature.

The method may include determining the amount of the heat energy added to the fluid by the fluid heating device based on an amount of time the fluid heating device was actuated to increase the temperature of the fluid from the first temperature to the second temperature.

The method may include determining the amount of the heat energy added to the fluid by the fluid heating device based on a current draw of the fluid heating device and an amount of time of actuation of the fluid heating device.

The method may include determining the quantity of the fluid stored by the fluid storage device based on an ambient temperature.

The method of may include determining the quantity of the fluid stored by the fluid storage device based on a difference between the ambient temperature and the first temperature of the fluid.

The method may include operating a vehicle in an autonomous mode upon determining the quantity of the fluid is greater than a threshold amount, and operating the vehicle in a non-autonomous upon determining the quantity of fluid is not greater than the threshold amount.

Figure 1:
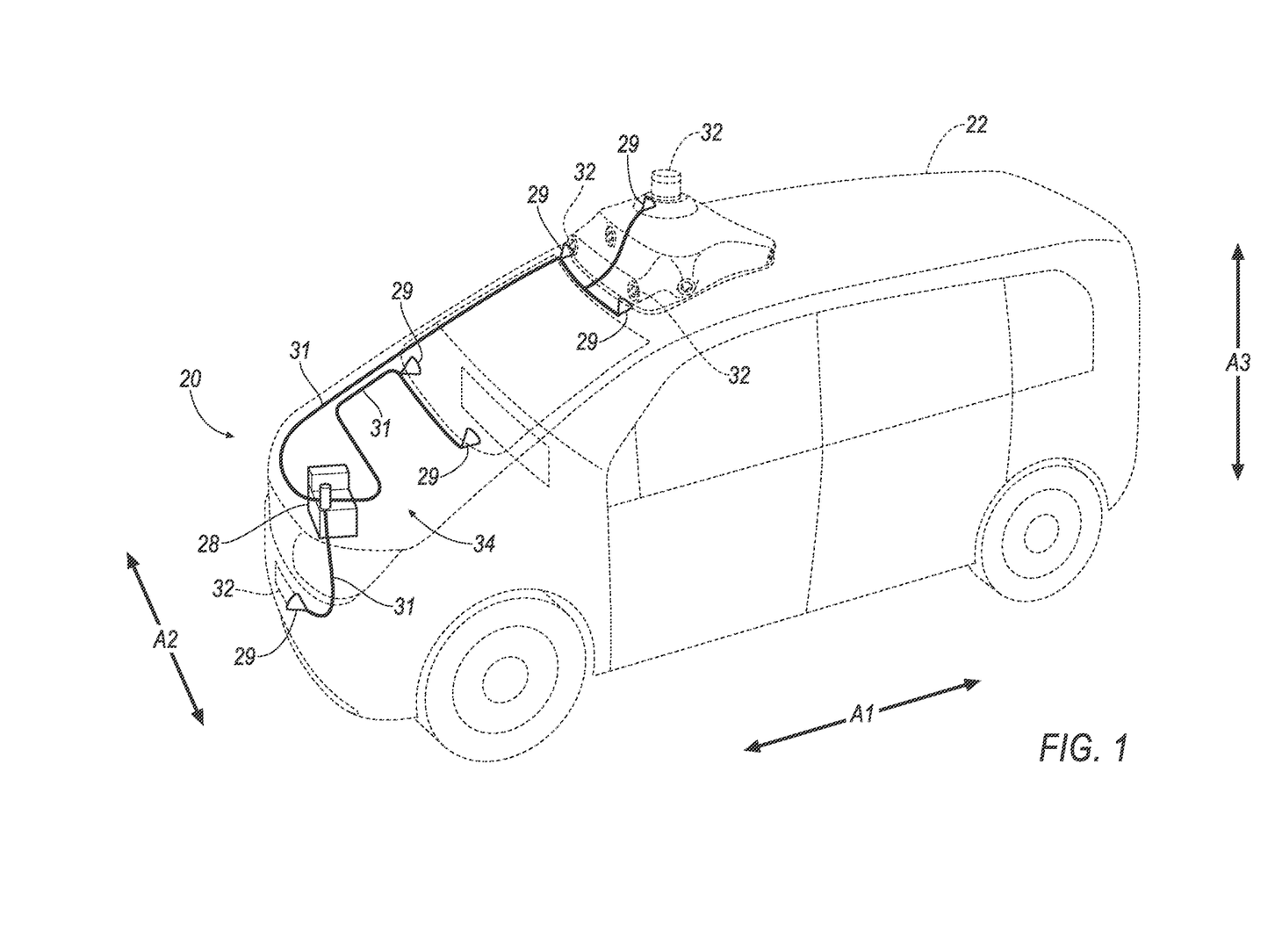
FIG. 1 is a perspective view of a vehicle including a fluid washer assembly.
Figure 2:
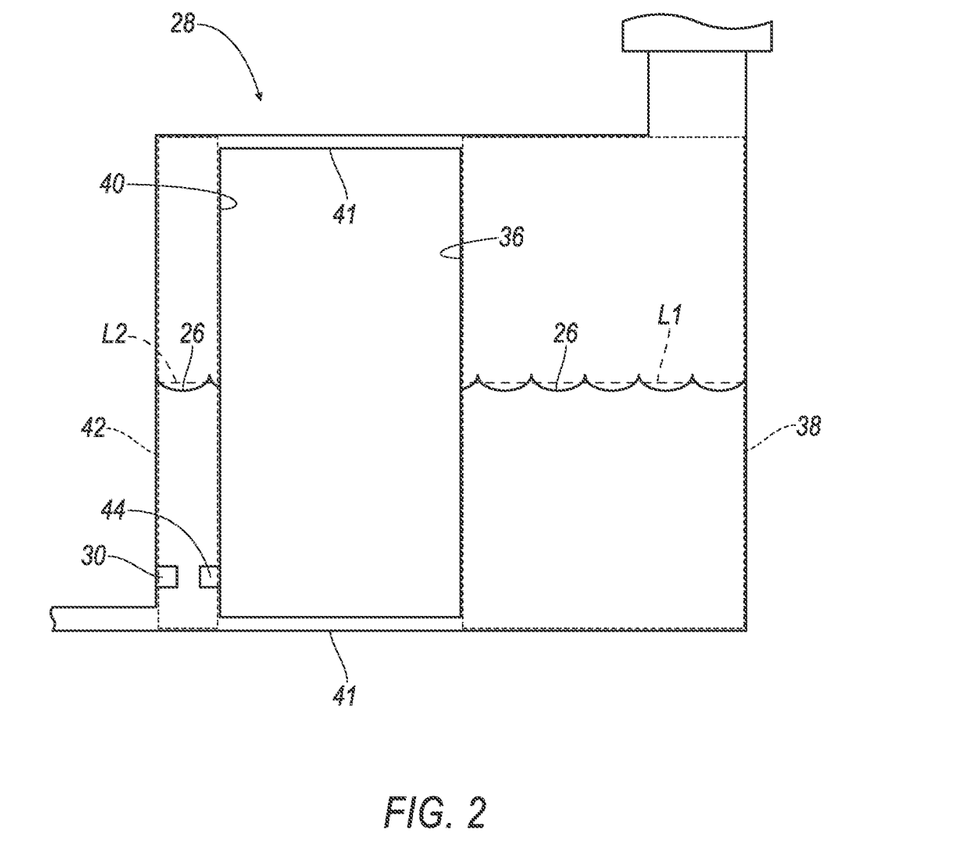
FIG. 2 is a schematic view of a fluid storage device of the fluid washer assembly.
Figure 3:
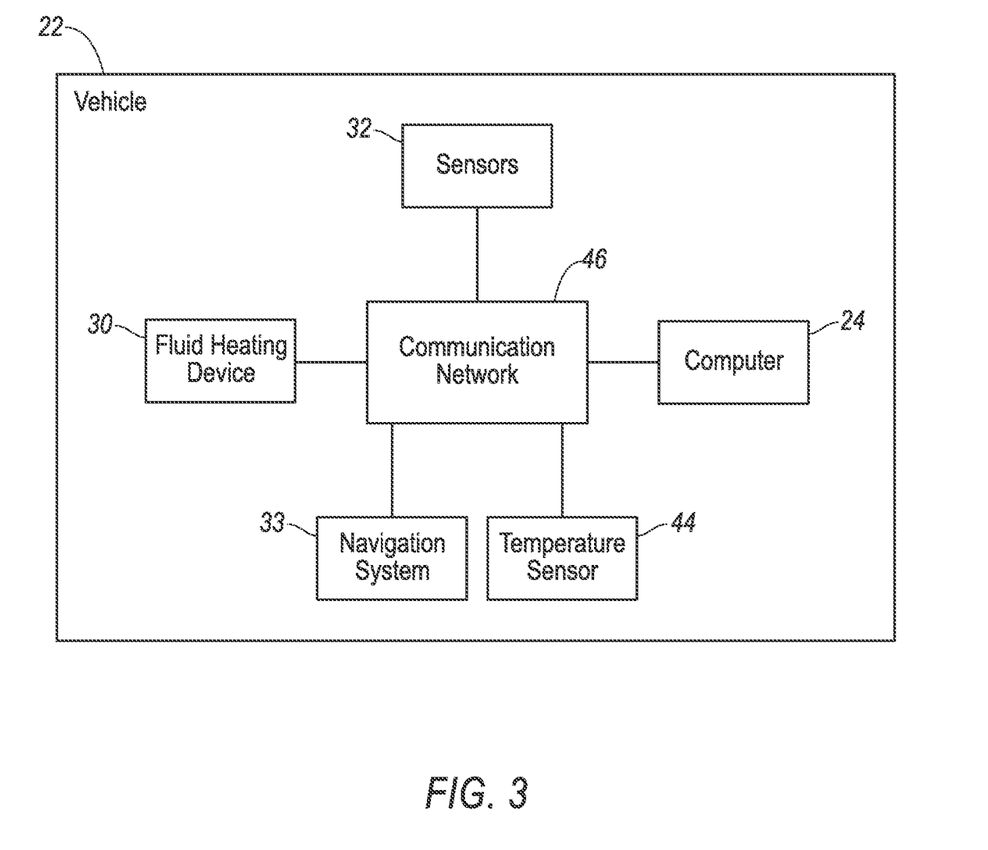
FIG. 3 is a block diagram of components of the vehicle.

With reference to FIGS. 1-3, wherein like numerals indicate like parts throughout the several views, a system 20 for a vehicle 22 includes a computer 24 having a processor and a memory storing instructions executable by the processor to determine a first temperature of a fluid 26 stored by a fluid storage device 28. The instructions include instructions to actuate a fluid heating device 30 to add heat energy to the fluid 26. The instructions include instructions to determine an amount of heat energy added to the fluid 26 by the fluid heating device 30. The instructions include instructions to determine a second temperature of the fluid 26 stored by the fluid storage device 28 after adding heat energy to the fluid 26. The instructions include instructions to determine a quantity (i.e., including a mass and possibly also a volume) of the fluid 26 stored by the fluid storage device 28 based on the determined amount of heat energy added to the fluid 26 by the fluid heating device 30 and a difference between the determined first temperature and second temperature.

The determined quantity of fluid 26 is a more accurate measure than other conventional methods, e.g., the determined quantity of fluid 26 indicates a measured amount of fluid, not merely whether the fluid is above or below a specified amount. The determined quantity of fluid 26 may be used to determine whether there is enough fluid 26 to clean sensors 32 of the vehicle 22 for autonomous operation of the vehicle 22 along a route, whether a vehicle 22 can continue operations and/or for how long or for what distance the vehicle 22 can operate, etc.

Turning to FIG. 1, the vehicle 22 may be any type of passenger or commercial vehicle such as a car, a truck, a sport utility vehicle, a crossover vehicle, a van, a minivan, a taxi, a bus, etc. Although illustrated as a passenger vehicle, the vehicle 22 may be unoccupied, e.g., a land-based or aerial drone.

The vehicle 22 may operate in an autonomous mode, a semiautonomous mode, or a non-autonomous mode. For purposes of this disclosure, an autonomous mode is defined as one in which each of a propulsion system, a braking system, and a steering system are controlled by the computer 24; in a semiautonomous mode the computer 24 controls one or two of the propulsion system, the braking system, and the steering system; in a non-autonomous mode, a human operator controls the propulsion system, the braking system, and the steering system.

The vehicle 22 includes sensors 32, illustrated in FIGS. 1 and 3. The sensors 32 may detect internal states of the vehicle 22, for example, wheel speed, wheel orientation, and engine and transmission variables, temperatures of components of the vehicle 22 (such as an engine block), etc. The sensors 32 may detect the speed, velocity, acceleration, position and/or orientation of the vehicle 22, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 32 may detect the external world, for example, radar sensors, ultrasonic sensors, scanning laser range finders, light detection and ranging (LIDAR) devices, and image processing sensors such as cameras. The sensors 32 may include communications devices, for example, vehicle-to-infrastructure (V2I) or vehicle-to-vehicle (V2V) devices. The communication devices may receive data, e.g., from a server computer, specifying weather, temperature, humidity, wind speed, etc., of an environment external the vehicle 22, e.g., at the GPS location of the vehicle 22.

The vehicle 22 may include a navigation system 33, e.g., as illustrated in FIG. 3. The navigation system 33 is implemented via circuits, chips, or other electronic components that can determine a present location of the vehicle 22. The navigation system 33 may be implemented via satellite-based system such as the Global Positioning System (GPS). The navigation system 33 may triangulate the location of the vehicle based on signals received from various satellites in the Earth's orbit. The navigation system 33 is programmed to output signals representing the present location of the vehicle 20 to, e.g., the computer 30 via a communication network 46. In some instances, the navigation system 33 is programmed to determine a route from the present location to a future location. The navigation system 33 may access a map stored in memory and develop the route according to the map data. The map may include data specifying lanes of roads of the map, e.g., including turn lanes, a direction of traffic flow for the lanes, etc.

The vehicle 22 has a fluid washer assembly 34 that includes the fluid storage device 28. The fluid washer assembly 34 further includes components to deliver the fluid 26 to various surfaces of the vehicle 22, e.g., to a surface of a windshield, to lenses or transparent shields for the sensors 32, etc. The fluid washer assembly 34 may include a fluid pump. The fluid storage device 28 and the fluid pump may be in fluid communication with nozzles 29 or the like aimed at the windshield, the lenses, the transparent shields, etc., i.e., a hose, tubing 31, a pipe, an opening, etc., is provided so that fluid 26 can travel from one to the other. Actuation of the fluid pump moves the fluid 26 from the fluid storage device 28 to the nozzles 29, e.g., in response to receiving a command from the computer 24.

As illustrated in FIG. 2, the fluid storage device 28 stores the fluid 26, e.g., to be provided to the fluid washer assembly 34. The fluid storage device 28 includes a first reservoir 36. The first reservoir 36 encloses a first volume 38. The fluid 26 may be stored in the first volume 38. The fluid storage device 28 may include a second reservoir 40. The second reservoir 40 encloses a second volume 42. The fluid 26 may be stored in the second volume 42. The second volume 42 is less than the first volume 38. The fluid reservoirs 36, 40 may be tanks or other suitable structure for storing liquid. For example, the second reservoir 40 may be an elongated tube.

The first reservoir 36 and the second reservoir 40 are in fluid communication, e.g., via tubing 41 or the like, such that a fluid level L2 of the second reservoir 40 is representative of a fluid level L1 of the first reservoir 36. In other words, the fluid 26 can flow from the first volume 38 to the second volume 42, and vice versa. Head pressure of the fluid 26 equalizes the fluid level L1 of the first reservoir 36 and the fluid level L2 of the second reservoir 40. The tubing 41 may be at a top and a bottom of the fluid reservoirs 36, 40, e.g., such that fluid 26 may flow between the fluid reservoirs 36, 40 through the tubing 41 at the bottom, and air may flow through the tubing 41 at the top, e.g., to prevent generation of a vacuum in the fluid reservoirs 36, 40.

The system 20 includes a temperature sensor 44 that generates data specifying a temperature detected by the temperature sensor 44. The temperature sensor 44 may include a thermistor, a thermocouple, a silicon bandgap temperature sensor, a resistance temperature detector, a semiconductor-sensor, etc. The temperature sensor 44 is configured to detect the temperature of the fluid 26 stored by the fluid storage device 28. For example, the temperature sensor 44 may be configured to detect a temperature of the fluid 26 in the second reservoir 40. The temperature sensor 44 may be fixed to the second reservoir 40, e.g., via fastener, adhesive, etc. The temperature sensor 44 may be immersed in the fluid 26.

The fluid heating device 30 converts electrical energy into heat energy. The fluid heating device 30 includes a heating element having an electrical resistor. For example, the fluid heating device 30 may include an immersion heater. The fluid heating device 30 may output heat energy at a specified rate, e.g., associated with a voltage provided and/or current of the electrical energy used by the fluid heating device 30. The fluid heating device 30 is configured to add heat energy to the fluid 26 stored by the fluid storage device 28, e.g., to the fluid 26 in the second reservoir 40. With reference to FIG. 2, the fluid heating device 30 may be thermally coupled to the second reservoir 40 such that heat energy from the fluid heating device 30 flows to the second reservoir 40 and to the fluid 26 therein. For example, the fluid heating device 30 may abut and be fixed to a wall of the second reservoir 40. The fluid heating device 30 may be in the second volume 42. For example, the fluid heating device 30 may be immersed in fluid 26 stored in the second reservoir 40.

Alternatively, the fluid heating device 30 may be a heat exchanger (not shown) connecting a component of the vehicle 22 that generates waste heat energy, such as the engine block, to the fluid 26 stored by the fluid storage device 28. For example, the heat exchanger may include tubing that is thermally coupled to the engine block and the second reservoir 40. The tubing may be immersed in the fluid 26. Fluid may flow through the tubing and collect heat energy from the engine block and dissipate heat energy to the fluid 26. A fluid pump and/or proportional valve may control flow of the fluid through the tubing to control an amount of heat energy transferred from the component of the vehicle 22 that generates waste heat energy to the fluid 26.

The temperature sensor 44 and the fluid heating device 30 may be a single unit that performs both temperature detection and heat generation. For example, the temperature sensor 44 and the fluid heating device 30 may be a thermistor.

FIG. 3 is a block diagram of components of the vehicle 22. The vehicle 22 includes the communication network 46 including hardware, such as a communication bus, for providing communication among components of the vehicle 22, such as the computer 24, the fluid heating device 30, the temperature sensor 44, the sensors 32, the propulsion system, the braking system, the steering system, etc. The communication network 46 facilitates wired or wireless communication among the components in accordance with a number of communication protocols such as controller area network (CAN), Ethernet, WiFi, Local Interconnect Network (LIN), and/or other wired or wireless mechanisms.

The computer 24, implemented via circuits, chips, and/or other electronic components, is included in the vehicle 22 for carrying out various operations, including as described herein. The computer 24 is a computing device that generally includes a processor and a memory, the memory including one or more forms of computer-readable media and storing instructions executable by the processor for performing various operations, including as disclosed herein. The memory of the computer 24 further generally stores remote data received via various communications mechanisms; e.g., the computer 24 is generally configured for communications on the communication network 46 or the like, and/or for using other wired or wireless protocols, e.g., Bluetooth, etc. The computer 24 may also have a connection to an onboard diagnostics connector (OBD-II). Via the communication network 46 and/or other wired or wireless mechanisms, the computer 24 can transmit and receive messages to and from various devices in the vehicle 22, e.g., the fluid heating device 30, the temperature sensor 44, the sensors 32, the propulsion system, the braking system, the steering system, etc. Although one computer 24 is shown in FIG. 3 for ease of illustration, it is to be understood that the computer 24 could include, and various operations described herein could be carried out by, one or more computing devices.

The computer 24 is programmed to, i.e., the memory stores instructions executable by the processor to, determine a temperature of the fluid 26 stored by the fluid storage device 28. The computer 24 can determine the temperature of the fluid 26 based on receiving a temperature datum or data from the temperature sensor 44, e.g., received via the communication network 46. The computer 24 may store the data specifying the temperature, e.g., in the memory, along with a time of such detection.

The computer 24 is programmed to actuate the fluid heating device 30 to add heat energy to the fluid 26, e.g., based on factors described below. The computer 24 can actuate the fluid heating device 30 by transmitting a command to the fluid heating device 30, e.g., via the communication network 46. The command may specify a current and/or a voltage of electricity for use by the fluid heating device 30. For example, the fluid heating device 30 may be designed to operate at a specified voltage, and such voltage may by stored in memory. The command may specify such voltage.

As another example, the fluid heating device 30 may be designed to operate within ranges of voltages and/or currents (e.g., 12-24 volts, 1-5 amps, etc.). Providing higher voltage and/or current increases the amount of heat energy generated by the fluid heating device 30. Increased heat energy may be useful for heating the fluid 26 when an ambient temperature proximate the fluid storage device 28 (described further below) is lower. In other words, the colder the ambient temperature, the greater the heat energy desired for heating the fluid 26. The computer 24 may store a look-up table or the like associating various ambient temperatures with various voltages and/or currents. The look-up table may be populated with predetermined values based on empirical testing indicating what voltage and/or currents are suited for use with the fluid heating device 30 at various ambient temperatures, e.g., taking into account an estimated volume of fluid to be heated, a thermal mass of the system 20, thermal diffusion, specific heat of the fluid, an amount of time generally desired to heat the fluid (e.g., balancing factors such as longer times and greater temperature changes producing more accurate results, and shorter time and lower temperature changes producing results faster and/or at closer intervals), etc. The computer 24 may send a command to the fluid heating device 30 specifying a voltage and/or current identified with such table based on the ambient temperature. The computer 24 may actuate the fluid heating device 30 to add heat for a specified amount of time, e.g., 30 seconds. The specified amount of time may be predetermined and stored in memory. The predetermined amount of time may be empirically determined by measuring various factors in combination with one another, e.g., desired change in temperature, desired accuracy, amount of heat energy generated by the fluid heating device, output of fluid 26 by the fluid washer assembly 34, etc.

When the fluid heating device 30 is a heat exchanger the computer 24 may actuate the fluid heating device 30 to add heat energy to the fluid 26 by controlling a flow of fluid through the tubing of the heat exchanger. For example, the computer 24 may command the proportional valve to open to permit an increase in fluid flow, and/or may actuate the fluid pump to increase fluid flow.

The computer 24 may actuate the fluid 26 device to add heat until the temperature of the fluid 26 has increased by a specified amount, e.g., 5 degrees Celsius. The specified amount of temperature increase may be predetermined and stored in memory. The specified amount may be empirically determined according to one or more various factors, e.g., desired amount of time of actuation, desired accuracy, amount of heat energy generated by the fluid heating device, desired temperature of the fluid 26 to clean the sensors 32 (e.g., to melt ice, to provide the fluid 26 with a certain viscosity), etc. The computer 24 may continue to receive data from the temperature sensor 44 while heating the fluid 26, e.g., to verify the fluid 26 is heated to increase by the specified amount.

The computer 24 is programmed to determine an amount of heat energy added to the fluid 26 by the fluid heating device 30, e.g., in Joules. The computer 24 may determine the amount of heat energy added to the fluid 26 based on an efficiency of the fluid heating device 30, a current drawn by the fluid heating device 30, and an amount of time the fluid heating device 30 was actuated, e.g., to heat the fluid 26 from the first temperature to the second temperature. The efficiency of the fluid heating device 30 specifies an amount of the electric energy provided to the fluid heating device 30 that is converted to heat energy, e.g., as a percentage. The computer 24 may calculate the current drawn by the fluid heating device 30 based on a voltage of the electricity and a resistance of the fluid heating device 30, e.g., using Ohm's law. The resistance and the efficiency may be known characteristics of the fluid heating device 30, e.g., specified by a heating device manufacturer, determined by empirical testing, etc., and may be stored in memory of the computer 24. The voltage may be commanded by the computer 24. The computer 24 may calculate the amount of heat energy added to the fluid 26 by using Equation 1 described below:

$$\Delta E = (I)(V)(\Delta t)(n) \qquad \text{Equation 1.}$$

In Equation 1, "$\Delta E$" is the amount of heat energy added to the fluid 26 (e.g., in Joules, e.g., in watt-hours) by the fluid heating device 30. "I" is the current drawn by the fluid heating device 30, e.g., as determined using Ohm's law. "V" is the voltage provided to the fluid heating device 30, e.g., in volts and as commanded by the computer 24. Multiplying the current drawn by the voltage provided yields power consumed by the fluid heating device 30, e.g., in Watts. "$\Delta t$" is an amount time of the of actuation of the fluid heating device 30, i.e., the amount of time the fluid heating device is supplied electrical power to heat the fluid 26. For example, "$\Delta t$" may be an amount of time between a first command instructing the fluid heating device 30 to generate heat energy, and a second command instructing the fluid heating device 30 to stop generating heat energy. "$\Delta t$" may be in seconds that are converted to hours, e.g., using a conversion factor. "n" is the efficiency of the fluid heating device 30. The computer 24 may use other techniques for determining the amount of heat energy added to the fluid 26, e.g., based on Kirchhoff's law, Fick's first and second laws, or other conventional techniques.

When the fluid heating device 30 is a heat exchanger the computer 24 may determine the amount of heat energy added to the fluid based on a flow rate of fluid through the heat exchanger, a temperature difference between the fluid 26 of the component of the vehicle 22 that generates waste heat energy, an amount of time the fluid flows though the heat exchanger, a specific heat of the fluid in the thermo couple, heat transfer rates to and from the heat exchanger, etc., e.g., using conventional techniques.

The computer 24 may be programmed to determine the ambient temperature proximate the fluid storage device 28, i.e., a temperature of air proximate the fluid storage device 28. Heat energy from such air is transferred to and from the fluid storage device 28. For example, the ambient temperature proximate the fluid storage device 28 may be a temperature of air in a compartment of the vehicle 22, such an engine compartment, in which the fluid storage device 28 is located. The computer 24 may determine the ambient temperature based on data from the sensors 32. For example, the computer 24 may determine the ambient temperature based on data from a temperature sensor supported in the compartment of the vehicle 22 in which the fluid storage device 28 is located. The data may specify a temperature detected by an ambient temperature sensor 32.

The computer 24 is programmed to determine a mass of the fluid 26 stored by the fluid storage device 28 based on an amount of heat energy added to the fluid 26 by the fluid heating device 30 and a change in temperature of the fluid 26 detected by the temperature sensor 44, i.e., a difference between a determined first temperature of the fluid 26 before adding heat energy with the fluid heating device 30 and a determined second temperature of the fluid 26 after adding heat energy with the fluid heating device 30. The computer 24 may further determine the mass of the fluid 26 stored by the fluid storage device 28 based on the ambient temperature, e.g., based on a difference between the ambient temperature and the temperature of the fluid 26 detected by the temperature sensor 44. For example, the computer 24 may calculate the mass of the fluid 26 stored by the fluid storage device 28 using Equation 2 described below:

$$m = \frac{(K)(\Delta E)}{(c)(\Delta T)}. \qquad \text{Equation 2}$$

In Equation 2, "m" is the mass of the fluid 26 (e.g., in kilograms). The computer 24 may further calculate a volume of the fluid 26 based on the mass so that either a mass of a volume can be used to specify a quantity of fluid 26. For example, the computer 24 may store a known density of the fluid 26 and may calculate the volume by dividing the mass by the density. The computer 24 may additionally calculate a quantity of the fluid 26 as a percentage of a fluid capacity of the fluid storage device 28. The fluid capacity may be a capacity of the first reservoir 36, a capacity of the second reservoir 40, a total amount of fluid storable by the fluid storage device 28, etc. The fluid capacity is a measurement of a volume of the fluid storage device 28 that can store fluid 26 heated by the fluid heating device 30, or alternatively a mass of heated fluid 26 that can be stored. For example, when the fluid heating device 30 heats the fluid 26 in the second reservoir 40, the fluid capacity is the amount of fluid then storable by the second reservoir 40. For example, the computer 24 may store a known mass or volume of a maximum quantity of fluid that the first reservoir 36, the second reservoir 40, the fluid storage device 28, etc., can store. The computer 24 may calculate the percentage by dividing the calculated mass or volume of the fluid 26 stored by the fluid storage device 28 by the capacity. Additionally or alternatively, the computer 24 may store a lookup table of the like associating various masses of fluid 26 with various quantities of fluid 26. An example table is provided below:

TABLE 1

| Mass (kg) | Quantity (liters) | Quantity (as a percent of capacity) |
|---|---|---|
| .1 | .1 | 10% |
| .5 | .5 | 50% |
| 1 | 1 | 100% |

The computer 24 may extrapolate or interpolate for values between those listed in the lookup table, e.g., using conventional techniques such as linear extrapolation or interpolation.

With further reference to Equation 2, "ΔE" is the amount of heat energy added to the fluid 26 (e.g., in Joules) by the fluid heating device 30. The amount of heat energy is determined by the computer 24 as described herein. "C" is the specific heat capacity of the fluid 26 (e.g., in Joules per kilogram per degree Celsius). "C" may be a known characteristic of the fluid 26 and may be stored in memory. "ΔT" is the change in temperature of the fluid 26 (e.g., in degrees Celsius). The change in temperature may be determined by the computer 24 based on data from the temperature sensor 44. For example, the computer 24 may subtract a detected temperature of the fluid 26 before the heat energy is added by the fluid heating device 30 from a detected temperature of the fluid 26 after the heat energy is added by the fluid heating device 30.

Also in reference to Equation 2, "K" is a unitless correction factor based on the ambient temperature. "K" provides a correction that compensates for heat energy added to the fluid 26 or subtracted from the fluid 26 from air proximate the fluid storage device 28. For example, "K" may correct for heat energy added to the fluid 26 when the fluid 26 is cooler than the ambient temperature. In this scenario, heat energy may be added to the fluid 26 that is not accounted for with the determined amount of heat energy added by the fluid heating device 30 (e.g., "ΔE"). As another example, "K" may correct for heat lost from the fluid 26 when the fluid 26 is warmer than the ambient temperature. In such situation heat energy may be subtracted from the fluid 26 that is not accounted for with the determined amount of heat energy added by the fluid heating device 30 (e.g., "ΔE"). "K" may be based on a difference between the ambient temperature and the temperature of the fluid 26 detected by the temperature sensor 44. For example, the computer 24 may store a lookup table or the like associating various differences in temperature with different correction factors. An example lookup table is provided below:

TABLE 2

| Difference in Temperature (degrees Celsius) | Correction Factor K |
|---|---|
| +10 | .9 |
| 0 | 1 |
| −10 | 1.1 |

The computer 24 may extrapolate or interpolate for values between those listed in the lookup table, e.g., using known techniques such as linear extrapolation or interpolation.

The various correction factors associated with the various differences in temperature may be determined based on empirical testing and/or computer simulation, e.g., using Equation 2 in various test situations having various controlled differences in fluid to ambient temperature to solve for "K" where the mass of fluid 26 (and other variables of Equation 2) are known.

The computer 24 may be programmed to operate the vehicle 22 in one of the autonomous mode or the non-autonomous mode. The computer 24 may operate the vehicle 22 in the autonomous mode based on data from the sensors 32, the navigation system 33, etc., e.g., using known techniques. The computer 24 may operate the vehicle 22 in the non-autonomous mode based on input from a driver, e.g., into to a steering wheel, accelerator pedal, brake pedal, etc., e.g., using known techniques.

The computer 24 select the autonomous mode or the non-autonomous mode based the determined quantity of the fluid 26 stored by the fluid storage device 28. The computer 24 may select the autonomous mode or the non-autonomous mode by comparing the determined quantity of the fluid 26 stored by the fluid storage device 28 with a threshold quantity. The computer 24 may operate the vehicle 22 in the autonomous mode in response to determining the determined quantity of fluid 26 is greater than the threshold quantity. The computer 24 may operate the vehicle 22 in the non-autonomous mode in response to determining the determined quantity of fluid 26 is not greater than the threshold quantity.

The threshold quantity may be a minimum quantity of fluid 26 that may be sufficient for cleaning the lenses or the like of the sensors 32 along a route, e.g., a minimum quantity of fluid 26 that is anticipated to be used before that vehicle 22 reaches a specified destination. The destination may be provided by an operator of the vehicle 22. The route may be determined by the navigation system 33. The route may specify a distance to the destination. The threshold quantity may be determined based on the route. For example, the computer 24 may store a lookup table or the like associating various fluid quantities with various distances. The computer 24 may further determine the threshold quantity based on a type of road along the route, e.g., paved or dirt, environmental conditionals, e.g., rain, sleet, etc. For example, the computer 24 may store various correction factors associated with a type of road, environmental conditions, etc., e.g., multipliers, to increase the fluid quantities from the table. The quantities associated with various distance, and the correction factors may be determined by empirical testing, e.g., indicating an amount of fluid typically used to clean the sensors 32 while the vehicle 22 travels the various distances on different types of roads and in various environmental conditions. The lookup table and the correction factors may be stored in memory.

As an alternative to operating in the non-autonomous mode when the determined quantity of fluid 26 is not greater than the threshold quantity, the computer 24 may command the navigation system 33 to determine a route that may be navigated by the vehicle 22 in the autonomous mode with the determined quantity of fluid 26. For example, the alternate route determined by the navigation system 33 may avoid certain types of roads, e.g., dirt and gravel roads. Alternatively, the computer 24 may command the navigation system 33 to determine a route to a different destination, e.g., a service location where more fluid 26 may be added to the fluid washer assembly 34.

Figure 4:
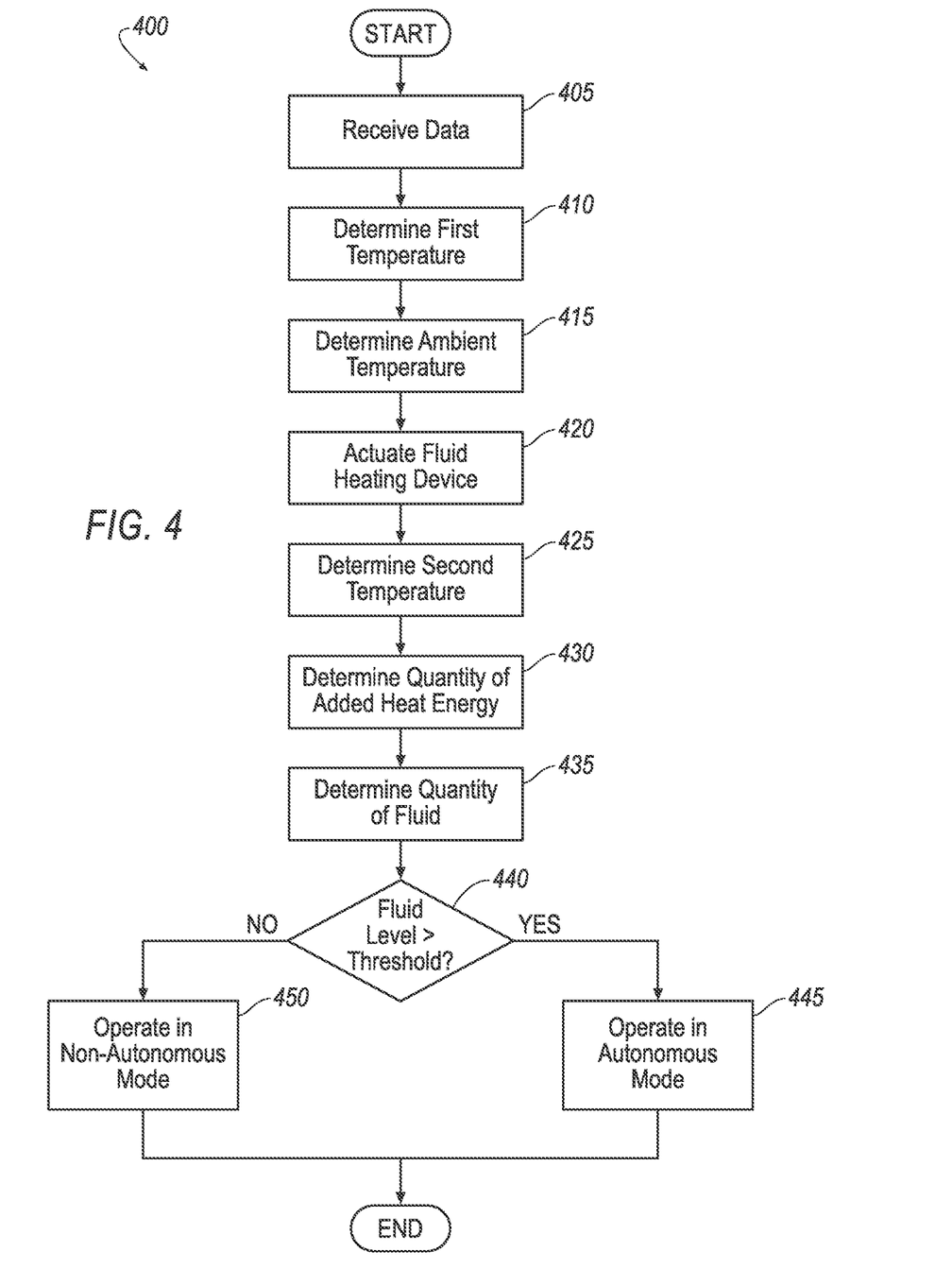
FIG. 4 is a flow chart illustrating a process for controlling the vehicle based on a determined fluid level of the fluid storage device.

FIG. 4 is a process flow diagram illustrating an exemplary process 400 for operating the vehicle 22. The process 400 begins in a block 405 where the computer 24 receives data, e.g., from the sensors 32, the temperature sensor 44, the navigation system 33, etc. The computer 24 may receive data throughout the process 400, e.g., substantially continuously or at intervals (e.g., every 50 milliseconds).

At a block 410, the computer 24 determines a first temperature of the fluid 26 stored by the fluid storage device 28. The computer 24 determines the first temperature based on data from the temperature sensor 44. The computer 24 may store the first temperature in a memory.

At a block 415, the computer 24 determines an ambient temperature proximate the fluid storage device 28. The computer 24 may determine the ambient temperature based on data from the sensors 32. The computer 24 may store the ambient temperature.

At the block 420, after determining the first temperature and the ambient temperature, the computer 24 actuates the fluid heating device 30 to add heat energy to the fluid 26, e.g., by commanding the fluid energy device 30 via the communication network 46. The computer 24 may actuate the fluid heating device 30 to add heat energy to the fluid 26 until the fluid 26 is a predetermined amount greater than the first temperature, for a predetermined amount of time, with a specified current and/or voltage, etc.

Next, at a block 425, the computer 24 determines a second temperature of the fluid 26 stored by the fluid storage device 28. The computer 24 may determine the second temperature based on data from the temperature sensor 44. The computer 24 may store the second temperature.

At a block 430, the computer 24 determines the amount of heat energy added to the fluid 26 by the fluid heating device 30 at the block 420. The computer 24 may determine the amount of heat energy added to the fluid 26 based on the efficiency of the fluid heating device 30, the current drawn by the fluid heating device 30, and the amount of time the fluid heating device 30 was actuated, e.g., by multiplying such factor with each other and as described herein.

At a block 435, the computer 24 determines a quantity of the fluid 26 stored by the fluid storage device 28. The computer 24 determines the quantity of fluid 26 based on the amount of heat energy added to the fluid 26 by the fluid heating device 30 determined at the block 430 and a difference between the first temperature determined at the block 410 and the second temperature determined at the block 425. The computer 24 may further determine the quantity of fluid 26 based on the ambient temperature determined at the block 415. For example, the computer 24 may use an equation and/or a lookup table and as described herein. The computer 24 may display the determined quantity of fluid 26, At a block 440, the computer 24 determines whether the quantity of fluid 26 determined at the block 435 is greater than a threshold quantity. The threshold quantity may be stored in memory, e.g. as described herein. To determine whether the quantity of fluid 26 determined at the block 435 is greater than the threshold quantity the computer 24 compares the quantity of fluid 26 determined at the block 435 with the threshold quantity. Upon determining the quantity of fluid 26 is greater than the threshold quantity the process 400 moves to a block 445. Upon determining the quantity of fluid 26 is not greater than the threshold quantity the process 400 moves to a block 450.

At the block 445, the computer 24 operates the vehicle 22 in the autonomous mode. In the autonomous mode the computer 24 controls the propulsion system, the braking system, and the steering system of the vehicle 22 based on data from the sensors 32. After the block 445 the process 400 may end. Alternately, the process 400 may return to the block 405.

At the block 450, the computer 24 operates the vehicle 22 in the non-autonomous mode. in a non-autonomous mode, a human operator controls the propulsion system, the braking system, and the steering system. After the block 450 the process 400 may end. Alternately, the process 400 may return to the block 405.

With regard to the process 400 described herein, it should be understood that, although the steps of such process 400 have been described as occurring according to a certain ordered sequence, such process 400 could be practiced with the described steps performed in an order other than the order described herein. It further should be understood that certain steps could be performed simultaneously, that other steps could be added, or that certain steps described herein could be omitted. In other words, the description of the process 400 herein is provided for the purpose of illustrating certain embodiments and should in no way be construed so as to limit the disclosed subject matter.

Computing devices, such as the computer 40, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The terms "in response to" and "upon" herein specify a causal relationship in addition to a temporal relationship.

The adjectives "first," "second," "third," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a fluid storage device configured to store a fluid in liquid form having a level that varies between empty and full based on a quantity of the fluid stored therein;
a computer having a processor and a memory storing instructions executable by the processor to:
determine a first temperature of the fluid stored by the fluid storage device and then actuate a fluid heating device to add heat energy to the fluid;
determine an amount of the heat energy added to the fluid;
determine a second temperature of the fluid stored by the fluid storage device after adding the heat energy to the fluid; and
determine the level based on the quantity of the fluid stored by the fluid storage device, the quantity of fluid being calculated based on the amount of the heat energy added to the fluid by the fluid heating device and a difference between the first temperature and the second temperature.

2. The system of claim 1, wherein the instructions include instructions to actuate the fluid heating device to add heat energy to the fluid until the second temperature is a predetermined amount greater than the first temperature.

3. The system of claim 2, wherein the instructions include instructions to determine the amount of the heat energy added to the fluid by the fluid heating device based on an amount of time that the fluid heating device was actuated to increase the temperature of the fluid from the first temperature to the second temperature.

4. The system of claim 1, wherein the instructions include instructions to determine the amount of the heat energy added to the fluid by the fluid heating device based on a current draw of the fluid heating device and an amount of time of actuation of the fluid heating device.

5. The system of claim 1, wherein the instructions include instructions to further determine the quantity of the fluid stored by the fluid storage device based on an ambient temperature.

6. The system of claim 5, wherein the instructions include instructions to further determine the quantity of the fluid stored by the fluid storage device based on a difference between the ambient temperature and the first temperature of the fluid.

7. The system of claim 1, wherein the instructions include instructions to operate a vehicle in an autonomous mode upon determining that the quantity of fluid is greater than a threshold amount, and to operate the vehicle in a non-autonomous mode upon determining that the quantity of fluid is not greater than the threshold amount.

8. The system of claim 1, further comprising the fluid storage device, a temperature sensor configured to measure a temperature of the fluid stored by the fluid storage device, and the fluid heating device configured to add heat energy to the fluid stored by the fluid storage device.

9. The system of claim 8, wherein the fluid storage device includes a first reservoir and a second reservoir in fluid communication with the first reservoir, such that a fluid level of the second reservoir is representative of a fluid level of the first reservoir.

10. The system of claim 9, wherein the temperature sensor is configured to measure a temperature of the fluid in the second reservoir.

11. The system of claim 10, wherein the temperature sensor is fixed to the second reservoir.

12. The system of claim 9, wherein the fluid heating device is configured to add heat energy to the fluid in the second reservoir.

13. The system of claim 9, wherein the second reservoir has a lower volume than the first reservoir.

14. The system of claim 8, further comprising a fluid washer assembly that includes the fluid storage device.

15. A method, comprising:
storing a fluid in liquid form in a fluid storage device, the fluid having a level that varies between empty and full based on a quantity of the fluid stored therein;
determining a first temperature of the fluid stored by the fluid storage device;
actuating a fluid heating device to add heat energy to the fluid;
determining an amount of the heat energy added to the fluid by the fluid heating device;
determining a second temperature of the fluid stored by the fluid storage device after adding the heat energy to the fluid; and
determining the level based on the quantity of the fluid stored by the fluid storage device, the quantity of fluid being calculated based on the amount of heat energy added to the fluid by the fluid heating device and a difference between the first temperature and the second temperature.

16. The method of claim 15, further comprising actuating the fluid heating device to add the heat energy to the fluid until the second temperature is a predetermined amount greater than the first temperature.

17. The method of claim 16, further comprising determining the amount of the heat energy added to the fluid by the fluid heating device based on an amount of time the fluid heating device was actuated to increase the temperature of the fluid from the first temperature to the second temperature.

18. The method of claim 15, further comprising determining the amount of the heat energy added to the fluid by the fluid heating device based on a current draw of the fluid heating device and an amount of time of actuation of the fluid heating device.

19. The method of claim 15, further comprising determining the quantity of the fluid stored by the fluid storage device based on an ambient temperature.

20. The method of claim 15, further comprising operating a vehicle in an autonomous mode upon determining the quantity of the fluid is greater than a threshold amount, and operating the vehicle in a non-autonomous mode upon determining the quantity of fluid is not greater than the threshold amount.

* * * * *